United States Patent [19]

Kan-Chee

[11] Patent Number: 5,058,954
[45] Date of Patent: Oct. 22, 1991

[54] BODY CONTOUR SUPPORT STRUCTURE FOR TRAVELERS AND AUDIENCES

[76] Inventor: Lee Kan-Chee, 1939 Greentree Rd., Cherry Hill, N.J. 08003

[21] Appl. No.: 425,758

[22] Filed: May 17, 1990

Related U.S. Application Data

[63] Continuation-in-part of Ser. No. 216,227, Jul. 7, 1988, abandoned.

[51] Int. Cl.⁵ .............................................. A47C 1/02
[52] U.S. Cl. .................................. 297/317; 297/430
[58] Field of Search ............... 297/317, 318, 322, 191, 297/396, 408, 430, 431, 435, 167

[56] References Cited

U.S. PATENT DOCUMENTS

| | | | |
|---|---|---|---|
| 1,189,705 | 7/1916 | Lenard | 297/430 |
| 2,888,977 | 6/1959 | Thaden | 297/430 X |
| 3,057,662 | 10/1962 | Johnson | 297/430 X |
| 3,572,829 | 3/1971 | Malitte | 297/317 |
| 3,773,381 | 11/1973 | Brennan | 297/167 X |
| 3,936,093 | 2/1976 | Hogan | 297/430 X |
| 4,431,231 | 2/1984 | Elazari et al. | 297/163 |
| 4,452,486 | 6/1984 | Zapf et al. | 297/343 |
| 4,726,621 | 2/1988 | Muller | 297/146 |

FOREIGN PATENT DOCUMENTS

| | | | |
|---|---|---|---|
| 1473282 | 3/1967 | France | 297/317 |
| 580900 | 8/1958 | Italy | 297/317 |
| 14530 | 1/1984 | Japan | 297/408 |
| 90938 | 12/1957 | Norway | 297/317 |

Primary Examiner—Laurie K. Cranmer

[57] ABSTRACT

A body contour support structure is supporting a human body in space. A bottom plate and a back plate are interhinged and supported by a base. The bottom and back plates rotating and sliding simultaneously in the guided directions are constituted by the orientations of the guides and pins, and a moveable pivot moves in an angled guide to maximize useable spaces in horizontal and vertical directions. The angle between the bottom and back plates is functioning from 90 degrees to 180 degrees providing a most comfortable reading, relaxing or sleeping environment within one seat's spacing. The present invention maximizes the useable spaces and achieves a significant economic value without compromising any space or comfort of the travelers or audiences. As a result of maximizing the useable spaces by ten (10) percent, a ten (10) percent additional gross income will go to the provider's profit or this profit will be shared between the travelers or audiences and provider. This body contour support structure can be equipped onto land, air and water vehicles, and in public and private premises. This particular invention is a real contribution to our daily living and a significant economic value to our many advancing industries.

2 Claims, 3 Drawing Sheets

BODY CONTOUR SUPPORT STRUCTURE FOR TRAVELERS AND AUDIENCES

This is a continuation-in-part of application Ser. No. 07/216,227, filed July 7, 1988, now abandoned.

BACKGROUND OF THE INVENTION

1. Field of the Invention

The present invention relates to traveling, entertaining and meeting accommodations. Said invention provides a comfortable and relaxing environment for the travelers and audiences. This invention achieves a significant economic value as the result of maximizing usable spaces in horizontal and vertical directions.

The conception of the present invention originated years ago when the applicant traveled on a bus, airplane, train or attended a theater. He felt that there was not enough room to straighten and relax his body without paying a higher cost for the traveling or entertainment.

2. Description of the Prior Art

A sliding chair, used as furniture, has been invented to slide a seat forward and a back plate rearward. See U.S. Pat. No. 4,362,336.

An adjustable tilting chair has been invented to tilt and swivel a seat on a cantilever support. See U.S. Pat. No. 4,653,806.

A chair, used as furniture, has been invented with a back structure which is connected with horizontal slides to provide adjustable inclination of the back and seat structures. See U.S. Pat. No. 3,870,365.

A recliner chair has been invented to provide rotating, tilting and reclining positions. See U.S. Pat. No. 3,926,472.

A seat, for a motor vehicle, has been invented to oscillate the back of a person. See U.S. Pat. No. 4,676,550.

A chair includes a lower seat cushion member and a rear back cushion member both independently pivotable about pivots on the chair frame. The occupant of the chair can cause the cushions to pivot so as to assume the proper support position for the occupant. See U.S. Pat. No. 3,945,651.

A seat with a fixed angle between the back and bottom has been invented to provide tiltable positions. See U.S. Pat. No. 3,572,829.

A chair with a tiltable back pivotable at its lower end and a forwardable seat to provide inclination. See Norway Pat. No. 90,938.

A reclinable chair with weight balance in all positions has been invented. See Italy Pat. No. 580,900.

An upper portion of a chair back is fixed and a lower portion of this chair back is movable forward with the seat. See France Pat. No. 1,473,282.

All prior art references can be grouped into three categories. The first, the most commonly used, today, in airplanes, trains and long distance buses, is seat with the back plate inclining backward and pivoting at its lower end, with the bottom plate fixed in position at all times. The second is seats with the back plate not pivoting at their lower end and the bottom plate moving forward while the back plates are pivoting. The others are not commonly used, such as seats with a lowering back plate and a bottom plate moving forward, seats with a fixed angle between back plate and bottom plate, seats with tilting, swiveling or oscillating movements.

None of the prior art references show an apparatus for the purposes of increasing usable space in horizontal and vertical directions, straightening a human body in a comfortable and relaxing environment, nor achieving a significant economic value.

Accordingly, there remains a need for an invention to maximize usable space thereby achieving a comfortable and relaxing environment and a significant economic value for travelers and audiences.

SUMMARY

The present invention is an economical, comfortable, relaxing and cost effective body contour support structure for travelers and audiences. It can be equipped onto, but not be limited to, air, land and water vehicles, such as airplanes, buses, cars, trains and ships; and places, such as theaters, convention halls, and public and private premises.

The body contour support structure comprises a base, a bottom plate and a back plate. The bottom and back plates are sliding and rotating from sitting to inclining positions. These movements are constituted by a number of means of rotating and sliding which are interconnected to the base, bottom and back plates of the body contour support structure.

The angle between the bottom plate and the back plate increases substantially from 90 degrees to 180 degrees to straighten a human body, thereby maximizing the useable spaces in horizontal and vertical directions to provide a comfortable and relaxing environment, constituting a first difference from all prior art references.

The following are also the differences between the present invention and all prior art references.

The second difference is the upward and rotating movement of the back plate to extend and increase the horizontal and vertical spaces when the back plate is in incline position.

The third difference is the downward movement of the front end of the bottom plate. It is able to extend and increase the leg room to straighten the legs of an occupant.

The fourth difference is the upward movement of the rear part of the bottom plate. This movement increases the vertical space under this bottom plate while the back plate is in incline position.

The fifth difference is the guided upward or downward movement of the front end of the bottom plate in a suitable position to accommodate the leg room of an occupant.

The sixth difference is the configurations and compositions of the bottom plate and the back plate which maximize the useable spaces and provide adequate comfort.

The invention will be better understood by reading the following terms, descriptions and figures showing the configurations and the compositions of the elements of the invention.

TERMS AND ELEMENTS OF THE INVENTION

Body contour support structure: Body contour support structure is a structure which is supporting a human body in space.

Space: Space is an unobstructed place which can be occupied by objects.

Base: A base made of suitable material and may comprised of portions is a supporting structure which supports a bottom plate and a back plate. The base can be installed on a floor or cantilever supported by other structural member. Also, base can be slid and locked in position.

Bottom plate: A plate made of suitable material is rotating and sliding. It supports a human bottom.

Back plate: A plate made of suitable material and may be comprised of portions is rotating and sliding with a upward movement above the bottom plate. It supports a human back and head.

Hinge connection: A hinge connection is a means of rotatable connection.

Means of rotating and sliding: It is a means of rotating and sliding which slides and rotates the bottom and back plates in sitting and inclining positions. The unlimited examples include the guides and pins which constitute the movements of the bottom and the back plates.

Position lock: A position lock made of suitable material is a means of locking the bottom and back plates in position. The unlimited examples include the mechanical spring and hydraulic locks.

It is to be understood that although certain systems, forms, terms and objects of this invention have been presented and described, it is not to be limited thereto except as claims are included in the claims.

Figure 1:
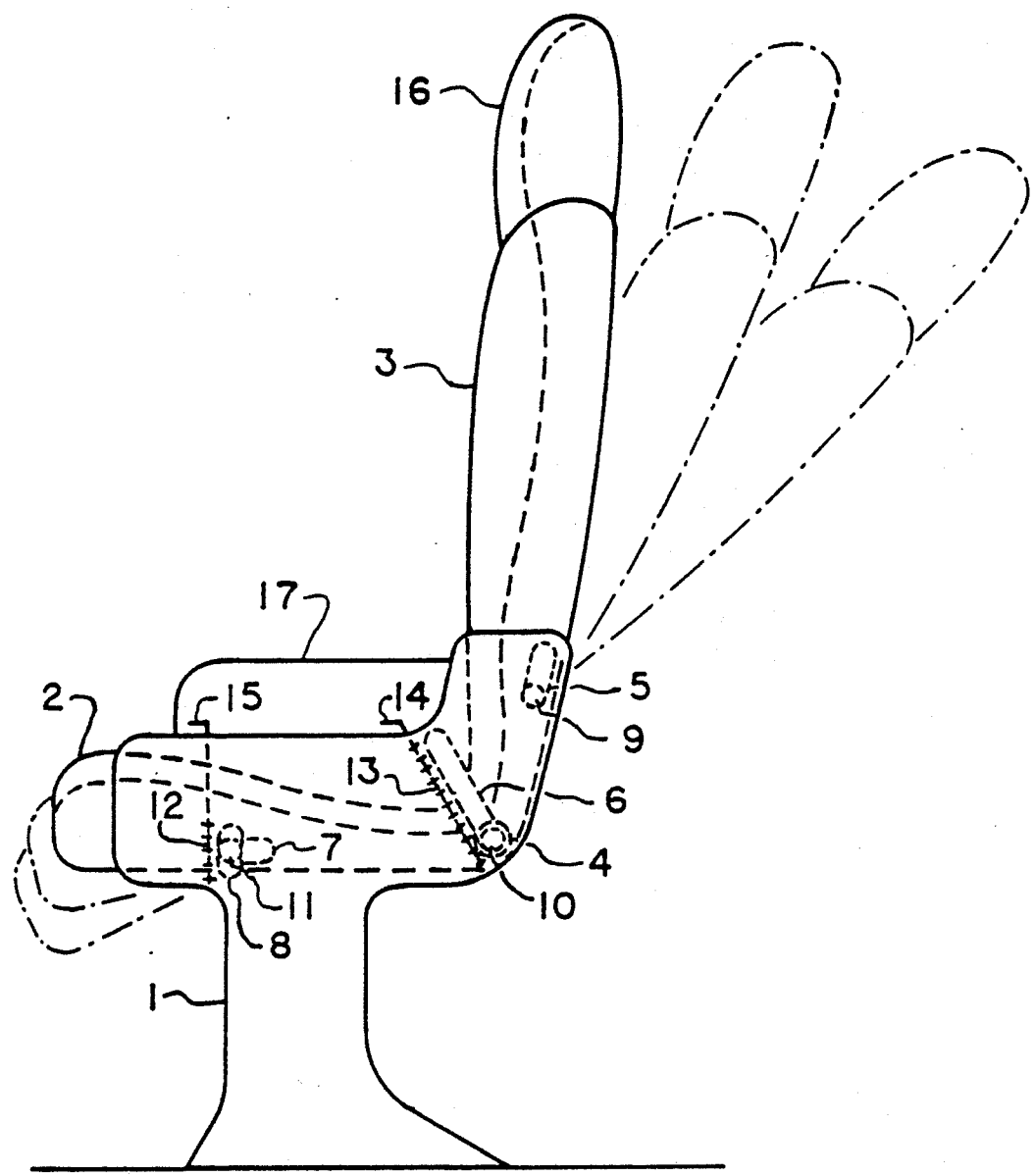
FIGS. 1 and 2 are the sectional side views of the schematic presentation of the body contour support structure of this particular invention.

DRAWING REFERENCE NUMERALS 1 base
2 bottom plate
3 back plate
4 hinge connection
5, 6, 7, 8 guides
9, 10, 11 pins
12, 13 position locks
14, 15 handle/switches
16 part of back plate 3
17 part of base 1

DESCRIPTION OF THE PREFERRED EMBODIMENTS

Referring to FIG. 1, the body contour support structure is composed of a base 1, a bottom plate 2 and a back plate 3. A hinge joint 4 is connecting the bottom plate and the back plate. The simultaneously rotating and sliding movements of the bottom plate and the back plate are constituted by the means of the orientation of the guides 5, 6, 7 and 8, and the pins 9, 10 and 11, in particular the hinge 4 is a movable pivot and moves in an angled guide 6 to maximize useable spaces occupied by the bottom and back plates in horizontal and vertical directions, and to provide a most comfortable sitting, relaxing and sleeping environment. All guides and pins can be located either in the base or in the bottom or back plate, as long as each pin is guided by a guide. Such as, the guide 5 is located in the back plate with a pin 9 extending from the base, the guide 6 is located in the base and the pin 10 is extending from the bottom and back plates at the location of the hinge connection 4. Guides 7 and 8 are located in the bottom plate with a pin 11 extending from the base. A position lock 12 is controlled by a handle or switch 14 to lock the bottom and back plates in sitting or inclining position. A position lock 13 is controlled by a handle or switch 15 to lock the front end of the bottom plate in a suitable position. The position locks 12 and 13 can be provided by means of mechanical spring and/or hydraulic function to immobilize the movement of the back and bottom plates in position. The end of the locks are attached to the base. Part of the back plate 16 is attached to the back plate 3. Part of the base 17 is attached to the base 1.

Figure 2:
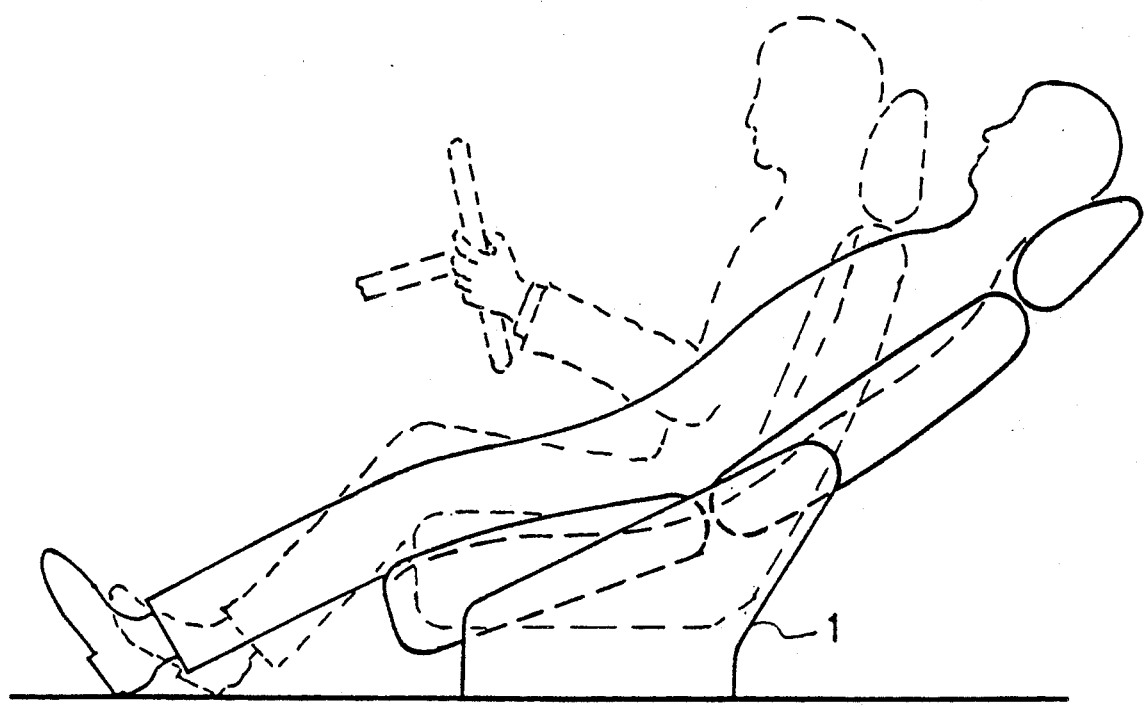

FIG. 2 is another preferred embodiment of the present invention. All elements, means and functions are similar to FIG. 1, except the configuration of the base 1 is somewhat different from the FIG. 1 as shown in the FIG. 2.

ECONOMIC VALUE OF THE INVENTION

Figure 3:
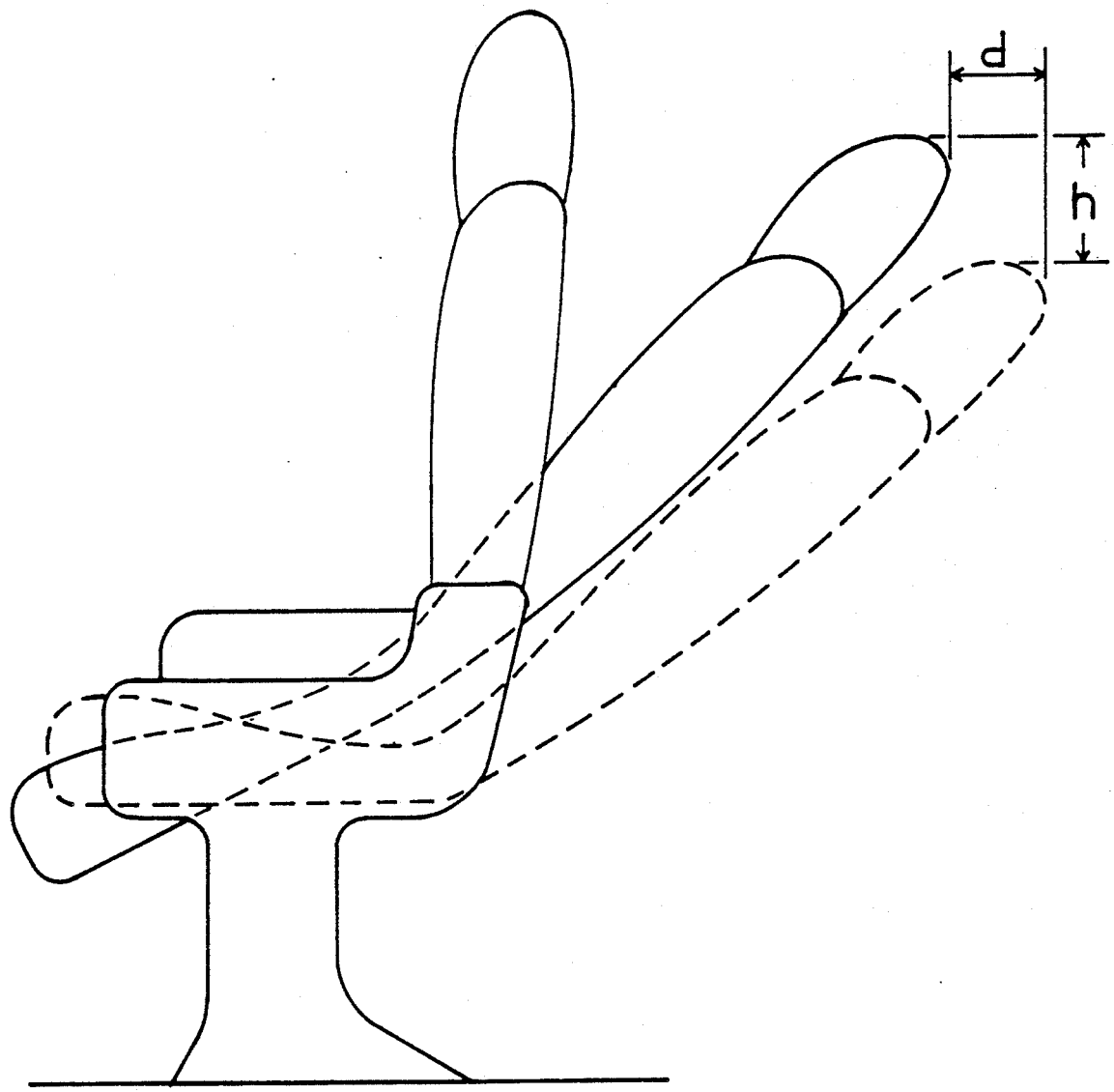
FIG. 3 is the comparison of the present invention, shown in solid lines, to the most commonly used, at present time, in airplanes, trains and long distance buses shown in dotted lines while both back plates are in the same inclination. The present invention increases the useable spaces "d" in horizontal and "h" in vertical directions. The distance of "d" is practically three (3) to four (4) inches in space. Since a seat to seat spacing is about thirty (30) to forty (40) inches, the increase of useable spaces is about ten (10) percent for the application of this particular invention.

The achievement of the application of the present invention will result in approximately ten (10) percent increase of the useable spaces in horizontal and vertical directions, as indicated in the FIG. 3 and the description of the drawings, without compromising any space and comfort of travelers or audiences. As a result, ten (10) percent of additional gross income will go to the provider's profit or this profit will be shared between passengers or audiences and provider with no or negligible increase in operating cost. The present invention will materially achieve a great economic value, and a comfortable and relaxing environment.

I claim:

1. A body contour support structure supporting a human body in space, said structure rotating and sliding to maximize usable spaces in horizontal and vertical directions, the structure providing a sitting or inclining position, comprising:
    (a) a bottom plate with means of rotating and sliding along a guided direction;
    (b) a back plate with means of rotating and sliding along a guided direction;
    (c) a hinge means connecting said bottom plate to said back plate in an angular relationship;
    (d) a base supporting the bottom plate and back plate;
    (e) means locking the bottom plate and back plate in a desired position; and
    (f) an angled guide slot means disposed in said base for receiving said hinge means such that the hinge means can simultaneously pivot and slide thereby resulting in an upward and rotating movement of the back plate and a downward and rotating movement of a front end of the bottom plate, wherein said angular relationship can change from 90 degrees to 180 degrees, thereby optimizing comfort to the user.

2. A body contour support structure as set forth in claim 1, wherein said means for locking comprises and combines a spring lock, a hydraulic lock and or a mechanical lock.

* * * * *